(No Model.)
J. W. JONES.
CATCHING AND HOLDING TOOL.
No. 511,148. Patented Dec. 19, 1893.
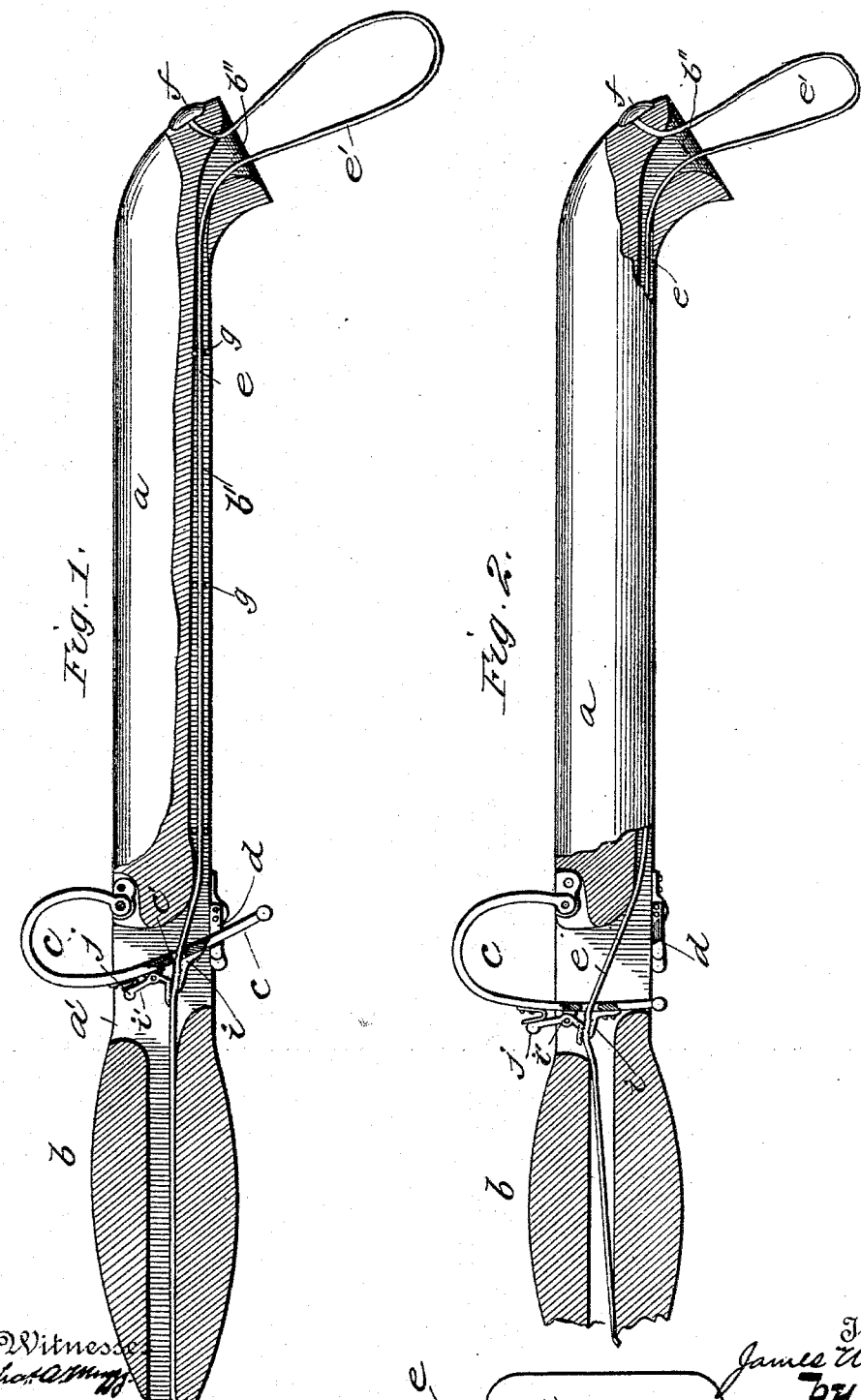
Witness
Chas. O. Muzzy
W. Harvey Muzzy
Inventor
James W. Jones
by
Alexander & Davis
his Attorneys
THE NATIONAL LITHOGRAPHING COMPANY,
WASHINGTON, D. C.

UNITED STATES PATENT OFFICE.

JAMES W. JONES, OF LINCOLN, ILLINOIS.

CATCHING AND HOLDING TOOL.

SPECIFICATION forming part of Letters Patent No. 511,148, dated December 19, 1893.

Application filed May 11, 1893. Serial No. 473,766. (No model.)

*To all whom it may concern:*

Be it known that I, JAMES W. JONES, a citizen of the United States, residing at Lincoln, in the county of Logan and State of Illinois, have invented certain new and useful Improvements in Tools for Holding Animals, of which the following is a specification, reference being had therein to the accompanying drawings.

This invention relates to a new and improved "stock twitch" or tool for securely holding animals during any veterinary operation; it may also be used for catching animals if desired; and it has for its object to provide a device of simple construction, the holding wire of which may be readily adjusted into a loop around the animal's nose, and said loop tightened and automatically held in its taut position, and to provide means whereby said loop may be still further tightened should it work loose at any time during the operation, without the necessity of grasping the tool with two hands, as is necessary in the first adjustment.

In the drawings:—Figure 1 is a longitudinal section of the device; and Fig. 2 is a similar view showing the parts in a different adjustment.

Referring to the parts, $a$ designates the bar of the device, which may be of any desired length, and is curved at one end as shown, and is provided with a handle $b$ at its other end. This bar is formed with a longitudinal groove $b'$ on its under side, said groove at its forward end extending into the flaring opening $b''$ formed in the end of the bar, and at its rear end extending into a vertical opening $a'$ formed in the bar $a$ and extending entirely through it as shown. The handle $b$ is bored longitudinally as shown, the forward end of the bore opening into the opening $a'$. A strong flat spring $c$ is pivoted at one of its ends at the upper rear end of the opening $a'$, said spring extending above the bar $a$, and then being bent over rearwardly and down, its other end extending through the opening $a'$ and being normally held at the forward lower end thereof by a spring catch $d$. The lower end of the spring extends below the bar $a$ as shown.

The cord or wire $e$ is secured at the forward end of the bar $a$, at a point $f$; is formed into a loop $e'$, and is then carried rearwardly through the flaring opening $b''$; then through the groove $b'$, (it being held therein by the eyes $g$;) then through an opening $c'$ in the spring $c$, and through the handle $b$, its rear end being provided with a handle $h$.

On the rear side of spring $c$ adjacent to the opening $c'$ therein, is secured a spring clamping-device, said device consisting of a rigid jaw $i$ and a pivoted jaw $i'$, this pivoted jaw being spring actuated, and provided with an operating arm $j$. The face of the jaw $i'$ being in the rear of the pivot, any forward tension on the cord will cause it to bind more securely on said cord as is evident. The cord $e$ passes between the clamping jaws and is securely held therein, and is prevented from slipping forwardly through said clamp by the rearwardly extending teeth or serration formed on the adjacent faces of the jaws.

The operation of my device is as follows:— The loop $e'$ in the cord is placed over the animal's nose, and is drawn tightly thereon by means of the handle $h$. The clamp $i$ and $i'$ securely holds the cord in its adjusted position. Should the cord work loose during an operation it may be instantly tightened by simply touching the lower end of the spring $c$ and releasing it from the catch $d$. The spring when released will tend to straighten itself and spring rearwardly carrying the cord with it, thereby instantly putting a strong tension on the cord. The lower end of the spring coming into contact with the rear wall of opening $a'$ will stop the rearward movement of said spring; and when it is in this position the portion $j$ of the pivoted jaw $i'$ of the clamp will extend above the bar $a$ and will be in convenient position for operation when it is desired to release the cord from the clamp. The cord is released from the clamp by pressing said part $j$ rearwardly as is evident.

Having thus fully described my invention, what I claim is—

1. A device for holding animals consisting of a bar $a$, a cord secured thereto as described, and formed into a holding loop, a clamping device carried by the bar and adapted to hold the cord in its adjusted position, said clamping device consisting of a stationary jaw and a pivoted spring-actuated jaw, the face of the pivoted jaw being in rear of the pivot thereof, both jaws having teeth, substantially as described.

2. A device for holding animals consisting of a bar, a cord secured to it as described, a clamping device carried by the bar and adapted to hold the cord in its adjusted positions, and means carried by the bar for resiliently moving the clamping device rearwardly without releasing it from the cord, substantially as described.

3. A device for holding animals consisting of the bar a, the cord e secured to it as described, a spring secured to the bar, a clamping device for holding the cord carried by the spring, a catch for normally holding the spring under tension, whereby said spring may be released and the cord carried rearwardly instantly, substantially as described.

In testimony whereof I affix my signature in presence of two witnesses.

JAMES W. JONES.

Witnesses:
W. E. JONES,
E. C. PERKINS.